US012403689B2

(12) United States Patent
Gardner et al.

(10) Patent No.: US 12,403,689 B2
(45) Date of Patent: Sep. 2, 2025

(54) PRINT COMPONENT WITH MEMORY ARRAY USING INTERMITTENT CLOCK SIGNAL

(71) Applicant: HEWLETT-PACKARD DEVELOPMENT COMPANY, L.P., Spring, TX (US)

(72) Inventors: James Michael Gardner, Corvallis, OR (US); Scott A. Linn, Corvallis, OR (US); Michael W. Cumbie, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 105 days.

(21) Appl. No.: 17/706,529

(22) Filed: Mar. 28, 2022

(65) Prior Publication Data

US 2022/0219452 A1 Jul. 14, 2022

Related U.S. Application Data

(63) Continuation of application No. 16/767,914, filed as application No. PCT/US2019/016727 on Feb. 6, 2019, now Pat. No. 11,364,719.

(51) Int. Cl.
*B41J 2/045* (2006.01)

(52) U.S. Cl.
CPC ....... *B41J 2/04573* (2013.01); *B41J 2/04541* (2013.01); *B41J 2/04543* (2013.01)

(58) Field of Classification Search
CPC .................................................... B41J 2/04543
See application file for complete search history.

(56) References Cited

U.S. PATENT DOCUMENTS 4,026,402 A 5/1977 Byrd
4,872,028 A 10/1989 Lloyd
(Continued)

FOREIGN PATENT DOCUMENTS

CN 1727186 2/2006
CN 1922019 A 2/2007
(Continued)

OTHER PUBLICATIONS

"Four-Terminal Sensing." Wikipedia: The Free Encyclopedia. Wikimedia Foundation Inc., retrieved at https://en.wikipedia.org/wiki/Four-terminal_sensing, Sep. 16, 2018, 3 pages.
(Continued)

*Primary Examiner* — Shelby L Fidler
(74) *Attorney, Agent, or Firm* — Foley & Lardner LLP

(57) ABSTRACT

A print component includes a plurality of data pads, a clock pad to receive an intermittent clock signal, and a plurality of actuator groups each corresponding to a different liquid type and to a different one of the data pads. Each actuator group includes a plurality of configuration functions, an array of fluid actuators, and an array of memory elements including a first portion corresponding to the plurality of configuration functions and a second portion corresponding to the array of fluid actuators. Each time the intermittent clock signal is present on the clock pad, the array of memory elements to serially load a segment of data bits from the corresponding data pad, including loading a first portion of data bits into the first portion of memory elements, and loading a second portion of data bits into the second portion of memory elements.

27 Claims, 9 Drawing Sheets

(56) References Cited

U.S. PATENT DOCUMENTS

| | | | |
|---|---|---|---|
| 5,422,662 | A | 6/1995 | Fukushima et al. |
| 5,541,629 | A | 7/1996 | Saunders et al. |
| 5,751,302 | A | 5/1998 | Rezanka |
| 5,917,509 | A | 6/1999 | Becerra |
| 6,176,569 | B1 | 1/2001 | Anderson et al. |
| 6,302,507 | B1 | 10/2001 | Prakash et al. |
| 6,547,356 | B2 | 4/2003 | Edelen et al. |
| 6,616,256 | B1 | 9/2003 | Cook et al. |
| 6,698,862 | B1 | 3/2004 | Choi et al. |
| 7,104,624 | B2 | 9/2006 | Schloeman et al. |
| 7,159,959 | B2 | 1/2007 | Schremp |
| 7,252,353 | B2 | 8/2007 | Silverbrook et al. |
| 7,266,661 | B2 | 9/2007 | Walmsley |
| 7,267,417 | B2 | 9/2007 | Silverbrook et al. |
| 7,419,236 | B2 | 9/2008 | Masuda |
| 7,578,569 | B2 | 8/2009 | Silverbrook |
| 7,738,137 | B2 | 6/2010 | Graf et al. |
| 7,758,141 | B2 | 7/2010 | Sakurai |
| 7,832,842 | B2 | 11/2010 | Jackson Pulver et al. |
| 7,866,778 | B2 | 1/2011 | Silverbrook et al. |
| 7,976,115 | B2 | 7/2011 | Gibson et al. |
| 8,199,342 | B2 | 6/2012 | Martin |
| 8,348,373 | B2 | 1/2013 | Martin et al. |
| 8,353,567 | B1 | 1/2013 | Banerjee et al. |
| 8,556,364 | B2 | 10/2013 | Hoisington et al. |
| 8,777,364 | B2 | 7/2014 | Carrobe et al. |
| 8,864,260 | B1 | 10/2014 | Ge et al. |
| 9,415,585 | B1 | 8/2016 | Goyen et al. |
| 9,597,894 | B2 | 3/2017 | Buxton et al. |
| 9,776,395 | B2 | 10/2017 | Anderson et al. |
| 10,821,735 | B2 | 11/2020 | Anderson et al. |
| 11,364,719 | B2 * | 6/2022 | Gardner ............... B41J 2/04541 |
| 11,407,218 | B2 | 8/2022 | Rossi et al. |
| 11,413,862 | B2 | 8/2022 | Linn et al. |
| 11,485,134 | B2 | 11/2022 | Rossi et al. |
| 11,559,985 | B2 | 1/2023 | Linn et al. |
| 2003/0063297 | A1 | 4/2003 | Dodd |
| 2004/0104973 | A1 | 6/2004 | Huang et al. |
| 2004/0183842 | A1 | 9/2004 | Kobayashi et al. |
| 2005/0110814 | A1 * | 5/2005 | Imai ..................... B41J 2/04588 347/5 |
| 2005/0190217 | A1 | 9/2005 | Wade et al. |
| 2005/0206944 | A1 | 9/2005 | Walmsley et al. |
| 2006/0050100 | A1 * | 3/2006 | Kondoh ............... B41J 2/04581 347/19 |
| 2006/0092437 | A1 | 5/2006 | Martin |
| 2006/0109296 | A1 | 5/2006 | Shamoun et al. |
| 2006/0132518 | A1 | 6/2006 | Jackson Pulver et al. |
| 2006/0139380 | A1 | 6/2006 | Walmsley et al. |
| 2006/0181558 | A1 | 8/2006 | Walmsley et al. |
| 2007/0095928 | A1 | 5/2007 | Balinsky et al. |
| 2007/0126769 | A1 * | 6/2007 | Usui ...................... B41J 2/2128 347/15 |
| 2007/0177169 | A1 | 8/2007 | Han |
| 2007/0296743 | A1 * | 12/2007 | Sakurai ................ B41J 2/04543 347/5 |
| 2008/0036804 | A1 | 2/2008 | Sakurai |
| 2008/0123641 | A1 | 5/2008 | Park |
| 2008/0238969 | A1 | 10/2008 | Kasai |
| 2008/0303868 | A1 * | 12/2008 | Sakurai ................ B41J 2/14072 347/50 |
| 2009/0009545 | A1 * | 1/2009 | Takei ..................... B41J 2/0458 347/10 |
| 2009/0278879 | A1 * | 11/2009 | Takeuchi ............... B41J 2/0458 347/12 |
| 2009/0278890 | A1 * | 11/2009 | Yamaguchi .......... B41J 2/04541 347/59 |
| 2010/0124329 | A1 | 5/2010 | Lyman |
| 2010/0156992 | A1 * | 6/2010 | Xie .......................... B41J 2/155 347/49 |
| 2013/0063511 | A1 * | 3/2013 | Gardner ............... B41J 2/04573 347/14 |
| 2013/0257949 | A1 | 10/2013 | Qiu et al. |
| 2014/0078223 | A1 | 3/2014 | Ohmura |
| 2014/0111570 | A1 | 4/2014 | Nitta et al. |
| 2014/0320558 | A1 | 10/2014 | Ge et al. |
| 2015/0124019 | A1 | 5/2015 | Cruz-Uribe et al. |
| 2015/0266324 | A1 | 9/2015 | Qu et al. |
| 2016/0089885 | A1 | 3/2016 | Edelen et al. |
| 2017/0239944 | A1 | 8/2017 | Martin et al. |
| 2017/0242633 | A1 | 8/2017 | Martin et al. |
| 2017/0272231 | A1 | 9/2017 | Chen |
| 2017/0320320 | A1 | 11/2017 | Martin et al. |
| 2018/0050537 | A1 | 2/2018 | Bakker et al. |
| 2018/0147839 | A1 | 5/2018 | Ge et al. |
| 2018/0236761 | A1 | 8/2018 | Taniguchi et al. |
| 2018/0236762 | A1 | 8/2018 | Negishi et al. |
| 2018/0288276 | A1 | 10/2018 | Sato et al. |
| 2019/0061347 | A1 | 2/2019 | Bakker et al. |
| 2021/0206164 | A1 | 7/2021 | Gardner et al. |
| 2021/0213731 | A1 | 7/2021 | Linn et al. |
| 2021/0221120 | A1 | 7/2021 | Linn et al. |
| 2021/0354453 | A1 | 11/2021 | Martin et al. |
| 2021/0362494 | A1 | 11/2021 | Gardner et al. |

FOREIGN PATENT DOCUMENTS

| | | | |
|---|---|---|---|
| CN | 101092076 | A | 12/2007 |
| CN | 101522428 | A | 9/2009 |
| CN | 101574865 | A | 11/2009 |
| CN | 101784392 | A | 7/2010 |
| CN | 103358701 | A | 10/2013 |
| CN | 107073940 | A | 8/2017 |
| CN | 107206816 | A | 9/2017 |
| CO | 5570691 | A2 | 10/2005 |
| CO | 7160043 | A2 | 1/2015 |
| EP | 0972374 | A1 | 1/2000 |
| EP | 1212197 | A1 | 6/2002 |
| EP | 3717254 | B1 | 12/2023 |
| ES | 2788140 | A2 | 10/2020 |
| ES | 2885775 | T3 | 12/2021 |
| ES | 2892033 | T3 | 2/2022 |
| JP | 59-208977 | A | 11/1984 |
| JP | 02-208052 | A | 8/1990 |
| JP | 2004282330 | | 10/2004 |
| JP | 2004343468 | | 12/2004 |
| JP | 2005-205770 | A | 8/2005 |
| JP | 2007-525342 | A | 9/2007 |
| JP | 2009-292148 | A | 12/2009 |
| JP | 2011075387 | | 4/2011 |
| JP | 2016-032872 | A | 3/2016 |
| JP | 2016-165822 | A | 9/2016 |
| JP | 2018-505077 | A | 2/2018 |
| KR | 10-0739789 | B1 | 7/2007 |
| KR | 10-2017-0109239 | A | 9/2017 |
| TW | 200533107 | A | 10/2005 |
| TW | 201346749 | A | 11/2013 |
| TW | 201601509 | A | 1/2016 |
| WO | 99/40702 | A1 | 8/1999 |
| WO | 01/10647 | A1 | 2/2001 |
| WO | 2016/089371 | A1 | 6/2016 |
| WO | 2016/130157 | A1 | 8/2016 |
| WO | 2017/180142 | A1 | 10/2017 |
| WO | 2018/071034 | A1 | 4/2018 |
| WO | 2018/080479 | A1 | 5/2018 |
| WO | 2018/080480 | A1 | 5/2018 |
| WO | 2018/136084 | A1 | 7/2018 |
| WO | 2018/190855 | A1 | 10/2018 |
| WO | 2019/009902 | A1 | 1/2019 |
| WO | 2019/017951 | A1 | 1/2019 |
| WO | 2019/195816 | A1 | 10/2019 |

OTHER PUBLICATIONS

"What is a Kelvin connection and when should it be used?" retrieved at http://www.calibratorsinc.com/images/applications.pdf, Dated on or before Jan. 2019, 2 pages.

(56) References Cited

OTHER PUBLICATIONS

Hewlett-Packard Development Company, L.P., Int. Appl. No. PCT/US2019/016735 entitled Issue Determinations Responsive to Measurments filed Feb. 6, 2019 (29 pages).

* cited by examiner

PRINT COMPONENT WITH MEMORY ARRAY USING INTERMITTENT CLOCK SIGNAL

CROSS-REFERENCE TO RELATED APPLICATIONS

This application is a U.S. Continuation Application of National Stage application Ser. No. 16/767,914, filed May 28, 2020, entitled "PRINT COMPONENT WITH MEMORY ARRAY USING INTERMITTENT CLOCK SIGNAL" which is a U.S. National Stage Application of PCT Application No. PCT/US2019/016727, filed Feb. 6, 2019, entitled "PRINT COMPONENT WITH MEMORY ARRAY USING INTERMITTENT CLOCK SIGNAL".

BACKGROUND

Some print components may include an array of nozzles and/or pumps each including a fluid chamber and a fluid actuator, where the fluid actuator may be actuated to cause displacement of fluid within the chamber. Some example fluidic dies may be printheads, where the fluid may correspond to ink or print agents. Print components include printheads for 2D and 3D printing systems and/or other high precision fluid dispense systems.

Figure 1:
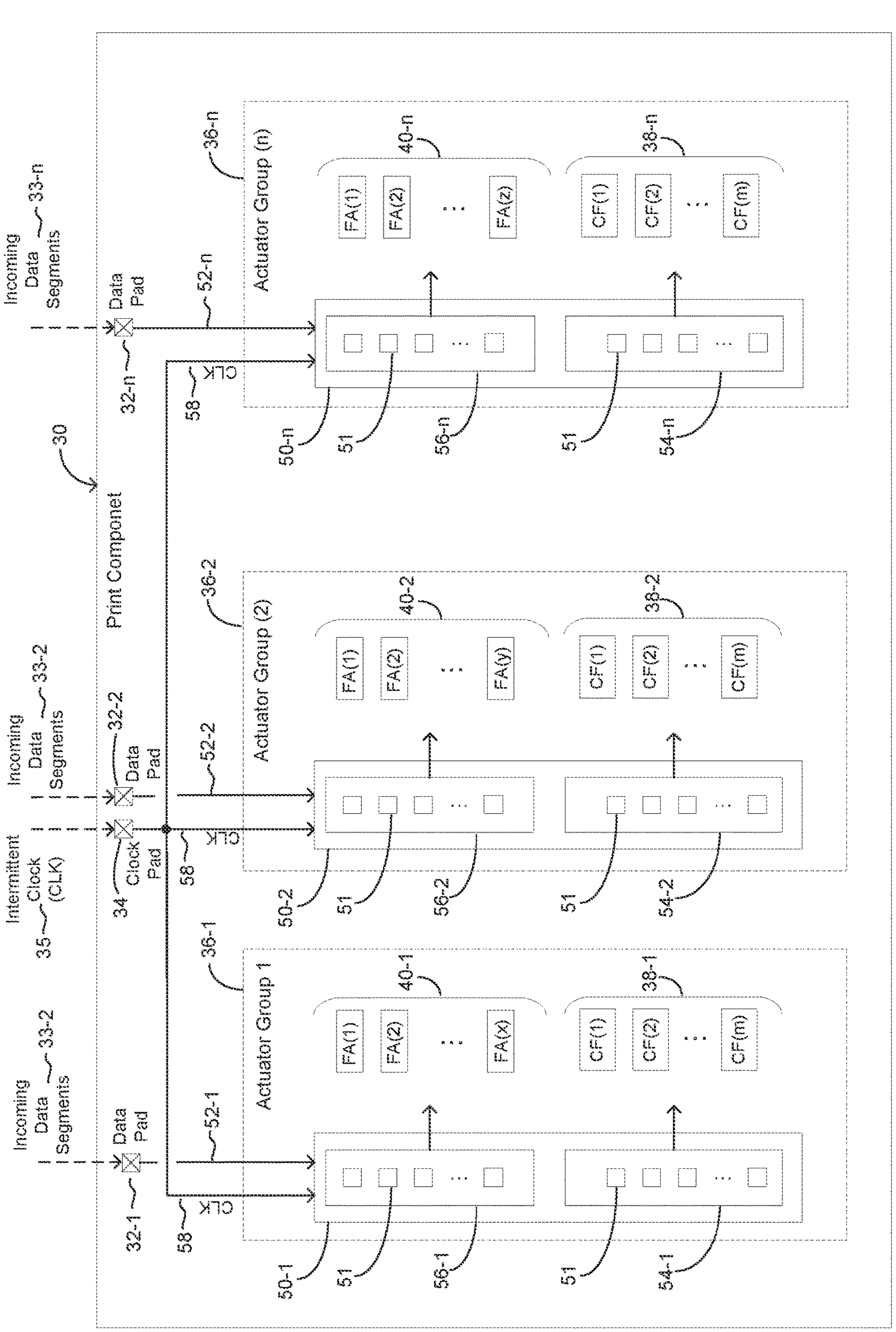
FIG. 1 is a block and schematic diagram illustrating a print component, according to one example.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Examples of fluidic dies may include fluid actuators. The fluid actuators may include thermal resistor based actuators (e.g. for firing or recirculating fluid), piezoelectric membrane based actuators, electrostatic membrane actuators, mechanical/impact driven membrane actuators, magneto-strictive drive actuators, or other suitable devices that may cause displacement of fluid in response to electrical actuation. Fluidic dies described herein may include a plurality of fluid actuators, which may be referred to as an array of fluid actuators. An actuation event may refer to singular or concurrent actuation of fluid actuators of the fluidic die to cause fluid displacement. An example of an actuation event is a fluid firing event whereby fluid is jetted through a nozzle.

In example fluidic dies, the array of fluid actuators may be arranged in sets of fluid actuators, where each such set of fluid actuators may be referred to as a "primitive" or a "firing primitive." The number of fluid actuators in a primitive may be referred to as a size of the primitive. In some examples, the set of fluid actuators of each primitive are addressable using a same set of actuation addresses, with each fluid actuator of a primitive corresponding to a different actuation address of the set of actuation addresses, with the addresses being communicated via an address bus. In some examples, a fluidic actuator of a primitive will actuate (e.g., fire) in response to a fire signal (also referred to as a fire pulse) based on actuation data corresponding to the primitive (sometimes also referred to as nozzle data or primitive data) when the actuation address corresponding to the fluidic actuator is present on the address bus.

In some cases, electrical and fluidic operating constraints of a fluidic die may limit which fluid actuators of each primitive may be actuated concurrently for a given actuation event. Primitives facilitate addressing and subsequent actuation of fluid actuator subsets that may be concurrently actuated for a given actuation event to conform to such operating constraints.

To illustrate by way of example, if a fluidic die comprises four primitives, with each primitive including eight fluid actuators (with each fluid actuator corresponding to a different address of a set of addresses 0 to 7), and where electrical and fluidic constraints limit actuation to one fluid actuator per primitive, a total of four fluid actuators (one from each primitive) may be concurrently actuated for a given actuation event. For example, for a first actuation event, the respective fluid actuator of each primitive corresponding to address "0" may be actuated. For a second actuation event, the respective fluid actuator of each primitive corresponding to address "5" may be actuated. As will be appreciated, such example is provided merely for illustration purposes, with fluidic dies contemplated herein may comprise more or fewer fluid actuators per primitive and more or fewer primitives per die.

Example fluidic dies may include fluid chambers, orifices, and/or other features which may be defined by surfaces fabricated in a substrate of the fluidic die by etching, microfabrication (e.g., photolithography), micromachining processes, or other suitable processes or combinations thereof. Some example substrates may include silicon based substrates, glass based substrates, gallium arsenide based substrates, and/or other such suitable types of substrates for microfabricated devices and structures. As used herein, fluid chambers may include ejection chambers in fluidic communication with nozzle orifices from which fluid may be ejected, and fluidic channels through which fluid may be conveyed. In some examples, fluidic channels may be microfluidic channels where, as used herein, a microfluidic channel may correspond to a channel of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

In some examples, a fluid actuator may be arranged as part of a nozzle where, in addition to the fluid actuator, the nozzle includes an ejection chamber in fluidic communication with a nozzle orifice. The fluid actuator is positioned relative to the fluid chamber such that actuation of the fluid actuator causes displacement of fluid within the fluid chamber that may cause ejection of a fluid drop from the fluid chamber via the nozzle orifice. Accordingly, a fluid actuator arranged as part of a nozzle may sometimes be referred to as a fluid ejector or an ejecting actuator.

In some examples, a fluid actuator may be arranged as part of a pump where, in addition to the fluidic actuator, the pump includes a fluidic channel. The fluidic actuator is positioned relative to a fluidic channel such that actuation of the fluid actuator generates fluid displacement in the fluid channel (e.g., a microfluidic channel) to convey fluid within the fluidic die, such as between a fluid supply and a nozzle, for instance. An example of fluid displacement/pumping within the die is sometimes also referred to as microrecirculation. A fluid actuator arranged to convey fluid within a fluidic channel may sometimes be referred to as a non-ejecting or microrecirculation actuator. In one example nozzle, the fluid actuator may comprise a thermal actuator, where actuation of the fluid actuator (sometimes referred to as "firing") heats the fluid to form a gaseous drive bubble within the fluid chamber that may cause a fluid drop to be ejected from the nozzle orifice. As described above, fluid actuators may be arranged in arrays (such as columns), where the actuators may be implemented as fluid ejectors and/or pumps, with selective operation of fluid ejectors causing fluid drop ejection and selective operation of pumps causing fluid displacement within the fluidic die. In some examples, the array of fluid actuators may be arranged into primitives.

Some printheads receive data in the form of data packets, sometimes referred to as fire pulse groups or a fire pulse group data packets, where each data packet includes a head portion and a body portion. In some examples, the head portion includes a sequence of start bits and configuration data for on-die functions such as address bits for address drivers, and fire pulse data for fire pulse selection, for example. The body portion of the packet includes primitive data, such as actuator data and/or memory data, that selects which nozzles corresponding to address represented by the address bits in the primitives will be actuated (or fired) and, in some examples, represents data to be written to memory elements of memory arrays associated the primitives. The fire pulse group data pack concludes with stop bits indicating the end of the data packet.

Such printheads include data parsers which use a free-running clock and operate to capture incoming data bits as they are received by the printhead in order to detect the start pattern and thereby identify the beginning of a fire pulse group data packet. Upon detecting a start pattern, the data parser circuitry collects bits as they are received and directs them to the appropriate primitives. In some examples, to determine when the data packet is complete, the data parser circuitry counts the total number of bits received. When the correct number of bits for a data packet has been received, the data parser circuitry stops distributing bits and returns to monitoring incoming data to identify a start sequence for another data packet.

Among other functions, data parser circuitry typically includes several counters, such as to indicate a particular group of primitives to which the data is to be directed (e.g., a printhead may include multiple columns of primitives), and to count a total number bits which have been received, for example. Data parser circuitry consumes relatively large amounts of silicon area on a printhead die, thereby increasing the size and cost of the die. Additionally, data parser circuitry is inflexible and requires each fire pulse group data packet for a printhead to have a fixed length. Additionally, a free running clock can potentially introduce electromagnetic interference (EMI) issues to the die.

The present disclosure, as will be described in greater detail herein, provides a print component having an array of memory elements to serially receive a segment of data bits including configuration data and primitive data each time an intermittent clock signal is received on a clock pad, which eliminates data parser circuitry and a free running clock. Such an arrangement reduces silicon area requirements, eliminates EMI introduced by a free-running clock signal, and enables arrays of fluid actuators having different primitive sizes, such as different fluidic dies, to share a clock and fire signals, which reduces interconnect complexity.

FIG. 1 is a block and schematic diagram generally illustrating a print component 30, according to one example of the present disclosure, including a plurality of data pads 32, illustrated as data pads 32-1 to 32-N, a clock pad 34 to receive an intermittent clock signal 35, and a plurality of actuator groups 36, illustrated as actuator groups 36-1 to 36-N, with each actuator group 36 corresponding to a different one of the data pads 32. In one example, each of the actuator groups 36 corresponds to a different fluid type. For instance, in one case, print component 30 comprises a printhead with each actuator group corresponding to a different type of ink (e.g., black, cyan, magenta, and yellow). In one example, each actuator group 36 of print component 30 is implemented in a different respective fluidic die where, in one case, each respective fluidic die corresponds to a different liquid type.

According to one example, each actuator group 36 includes a group of configuration functions 38, illustrated as 38-1 to 38-N, an array of fluid actuators 40, illustrated as arrays 40-1 to 40-N, and an array of memory elements 50, illustrated as arrays 50-1 to 50-N. In one case, each group of configuration functions 38 includes a number of configuration functions, illustrated as configuration functions CF(1) to CF(m), for configuring an operational setup of the corresponding actuator group 36. In examples, configuration functions CF(1) to CF(m) may include functions such as an address driver, a fire pulse configuration function, and a sensor configuration function (e.g., thermal sensors), for instance.

In one example, each array of fluid actuators 40 includes a number of fluid actuators (FAs), with array 40-1 of actuator group 36-1 including fluid actuators FA(1) to FA(x), array 40-2 of actuator group 36-2 including fluid actuators FA(1) to FA(y), and array 40-N of actuator group 40-N including fluid actuators FA(1) to FA(z). In one case, each array of fluid actuators 40 may have a same number of fluid actuators (x=y=z). In other cases, the arrays of fluid actuators 40 may have differing numbers of fluid actuators (x≠y≠z).

The array of memory elements 50 of each actuator group 36 comprises a number of memory elements 51, with each array 50 having a first portion of memory elements 52, illustrated as first portions 52-1 to 52-N, corresponding to the respective group of configuration functions 38, and a second portion of portion of memory elements 54, illustrated as second portions 56-1 to 56-N, corresponding to the respective array of fluid actuators 40. In some cases, the array of memory elements 50 of each actuator group 36 may have a same number of memory elements 51. In other cases, the array of memory elements 50 of different actuator groups 36 may have different numbers of memory elements 51.

The array of memory elements 50 of each actuator group 36 is connected to the corresponding data pad 32 via a corresponding communication path 52, with the arrays of memory elements 50-1 to 50-N being respectively connected to data pads 32-1 to 32-N by communication paths 52-1 to 52-*n*. In one example, as illustrated by the arrangement of FIG. 1, each array of memory elements 50 of each group of fluid actuators 36 is connected to and receives intermittent clock signal 35 via clock pad 34.

In one example, each time intermittent clock 35 is present on clock pad 34 of print component 30, the array of memory elements 50 of each actuator group 36 serially loads a data segment 33 comprising a series of data bits from the corresponding data pad 32, illustrated as data segments 33-1 to 33-*n*, with the data bits loaded into the first portion of memory elements 52 and into the second portion of memory elements 54 respectively corresponding to the group of configuration functions 38 and to the array of fluid actuators 40. In one example, each time intermittent clock signal 35 is present on clock pad 34, the array of memory elements 50 of each actuator group 36 serially loads the series of data bits of a current data segment 33, which replace the previously loaded data bits of the preceding data segment 33.

In one example, as will be described in greater detail below (e.g., see FIG. 3), the series of data bits of each data segment 33 include fire pulse groups similar to that described above. However, because print component 30, loads each data segment 33 only when intermittent clock signal 35 is present on clock pad 34 (i.e., does not employ a free running clock), the fire pulse groups of data segments 33 do not include a start-bit sequence. Since data segments 33 do not include a start-bit sequence and are loaded into the array of memory elements 50 only when intermittent clock signal 35 is present on clock pad 34, print component 30 and actuator groups 36, in accordance with the present disclosure, do not include data parser circuitry, thereby saving circuit area and reducing costs.

Additionally, as described in greater detail below, using an intermittent clock signal 35 and an array of memory elements 50 to serially receive data enables print component 30 to support multiple arrays of fluid actuators 40 having differing numbers of fluid actuators and using fire pulse groups of varying lengths while operating on a same intermittent clock signal 35 and sharing a common fire signal (as will be described in greater detail below). Furthermore, employing an intermittent clock signal eliminates potential EMI problems associated with free-running clocks.

Figure 2:
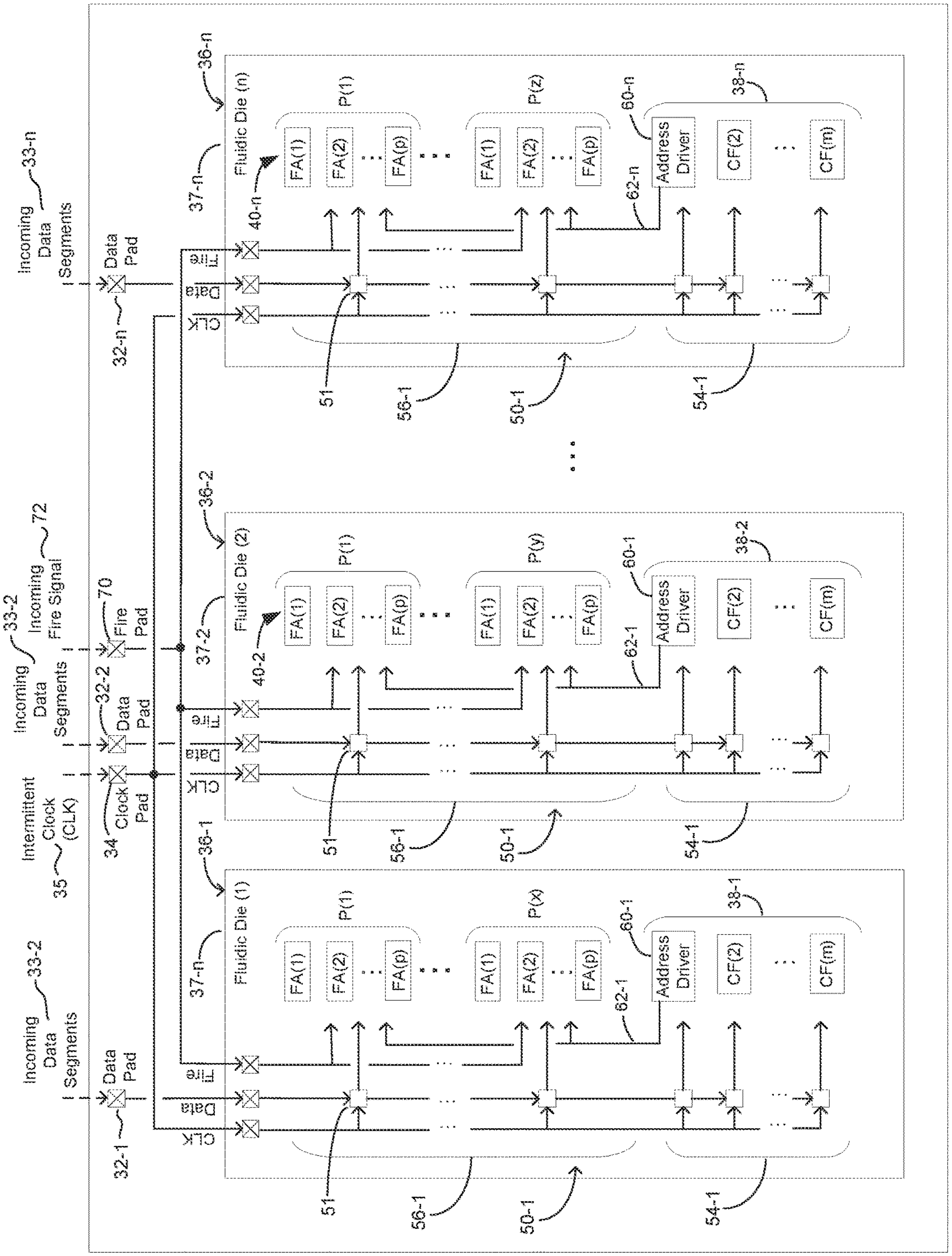
FIG. 2 is a block and schematic diagram illustrating a print component, according to one example.

FIG. 2 is a block and schematic diagram generally illustrating a print component 30, according to one example of the present disclosure. In one example, the actuator groups 36-1 to 36-*n* are implemented as fluidic dies 37-1 to 37-*n*. According to the example of FIG. 2, the fluid actuators (FA) of each of the arrays of fluid actuators 40-1 to 40-*n* of actuator groups 36-1 to 36-*n* are arranged to form a number of primitives, with the fluid actuators of array 40-1 of actuator group 36-1 arranged to form primitive P(1) to P(x), the fluid actuators of array 40-2 of actuator group 36-2 arranged to form primitive P(1) to P(y), and the fluid actuators of array 40-*n* of actuator group 36-*n* arranged to form primitive P(1) to P(z), with each primitive including a number of fluid actuators FA(1) to FA(p). In one case, each array of fluid actuators 40 may have a same number of primitives (x=y=z). In other cases, the arrays of fluid actuators 40 may have differing numbers of primitives (x≠y≠z). Although the primitives of each actuator group 36 is illustrated as having a same number of fluid actuators, p, in other examples, the number of fluid actuators in each primitive may vary between actuator groups 36.

In one example, as illustrated, the array of memory elements 50 of each actuator group 37 comprises a series or chain of memory elements 51 implemented to function as a serial-to-parallel data converter, with first portion 54 of memory elements 51 corresponding to the group of configuration functions 38, and second portion of memory elements 56 corresponding to the array of fluid actuators 40, with each memory element 51 o the second portion 56 corresponding to a different one of the primitives P(1) to P(x). In one example, the array of memory elements 50 of each actuator group 36 comprises a sequential logic circuit (e.g., flip-flop arrays, latch arrays, etc.). In one example, the sequential logic circuit is adapted to function as a serial-in, parallel-out shift register.

According to one example, the group of configuration functions 38 of each actuator group 36 includes an address driver 60, illustrated at address drivers 60-1 to 60-*n*, which drives an address onto a corresponding address bus 62, illustrated as address buses 62-1 to 62-*n*, based on address bits in corresponding memory elements 51 of first portion 54 of the array of memory elements 50, with memory bus 62 communicating the driven address to fluid actuators FA(1) to FA(p) of each of the corresponding primitives. In one example, print component 30 includes a fire pad 70 to receive a fire signal 72 which is communicated to each of the actuator groups 36 via a communication path 74.

Figure 3:
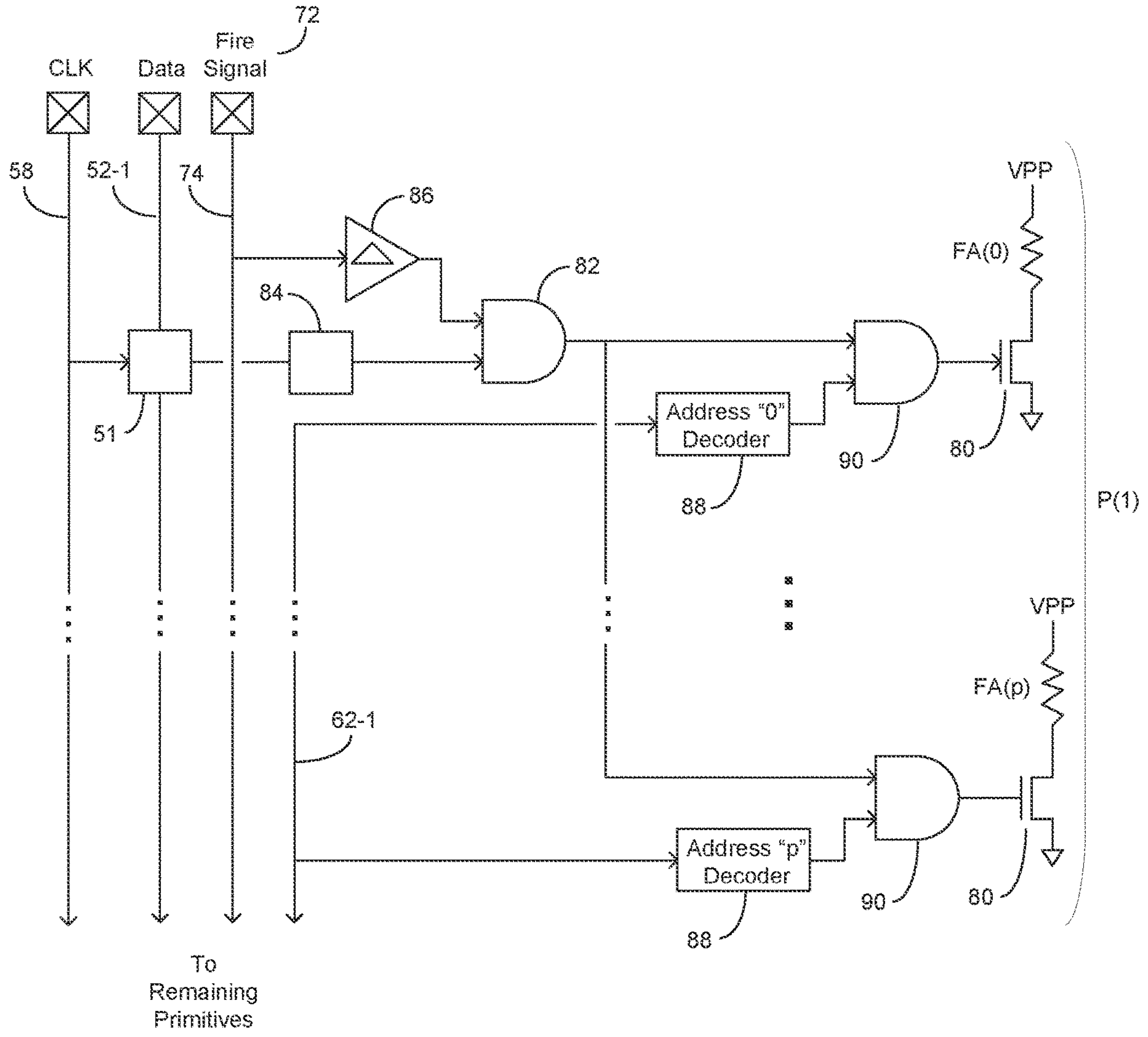
FIG. 3 is a block and schematic diagram generally illustrating portions of a primitive arrangement, according to one example.

An example of the operation of print component 30 of FIG. 2 is described below with reference to FIGS. 3 and 4. FIG. 3 is a block and schematic diagram generally illustrating portions of a primitive arrangement for the primitives of actuator groups 36-1 to 36-*n* of FIG. 2. For illustrative purposes, the block and schematic diagram of FIG. 2 is described with reference to primitive P(1) of actuator group 36-1 of FIG. 2.

In example, each fluid actuator, illustrated as a thermal resistor in FIG. 3, is connectable between a power source, VPP, and a reference potential (e.g., ground) via a corresponding controllable switch, such as illustrated by FETs 80.

According to one example, each primitive, including primitive P(1), includes an AND-gate 82 receiving, at a first input, primitive data (e.g., actuator data) for primitive P(1) stored in a local memory element 84, where local memory element receives such primitive data from corresponding memory element 51 of the array of memory elements 50-1 of actuator group 36-1. At a second input, AND-gate 82 receives fire signal 72 via communication path 70. In one example, fire signal 72 is delayed by a delay element 86, with each primitive having a different delay so that firing of fluid actuators is not simultaneous among primitives P(1) to P(x).

In one example, each fluid actuator has a corresponding address decoder 88 receiving the address driven by address driver 60-1 on address bus 62-1, and an AND-gate 90 for controlling a gate of FET 80. AND-gate 90 receives the output of corresponding address decoder 88 at a first input, and the output of AND-gate 82 at a second input. It is noted that address decoder 88 and AND-gate 90 are repeated for each fluid actuator, while AND-gate 82, memory element 84, and delay element 86 are repeated for each primitive.

Figure 4A:
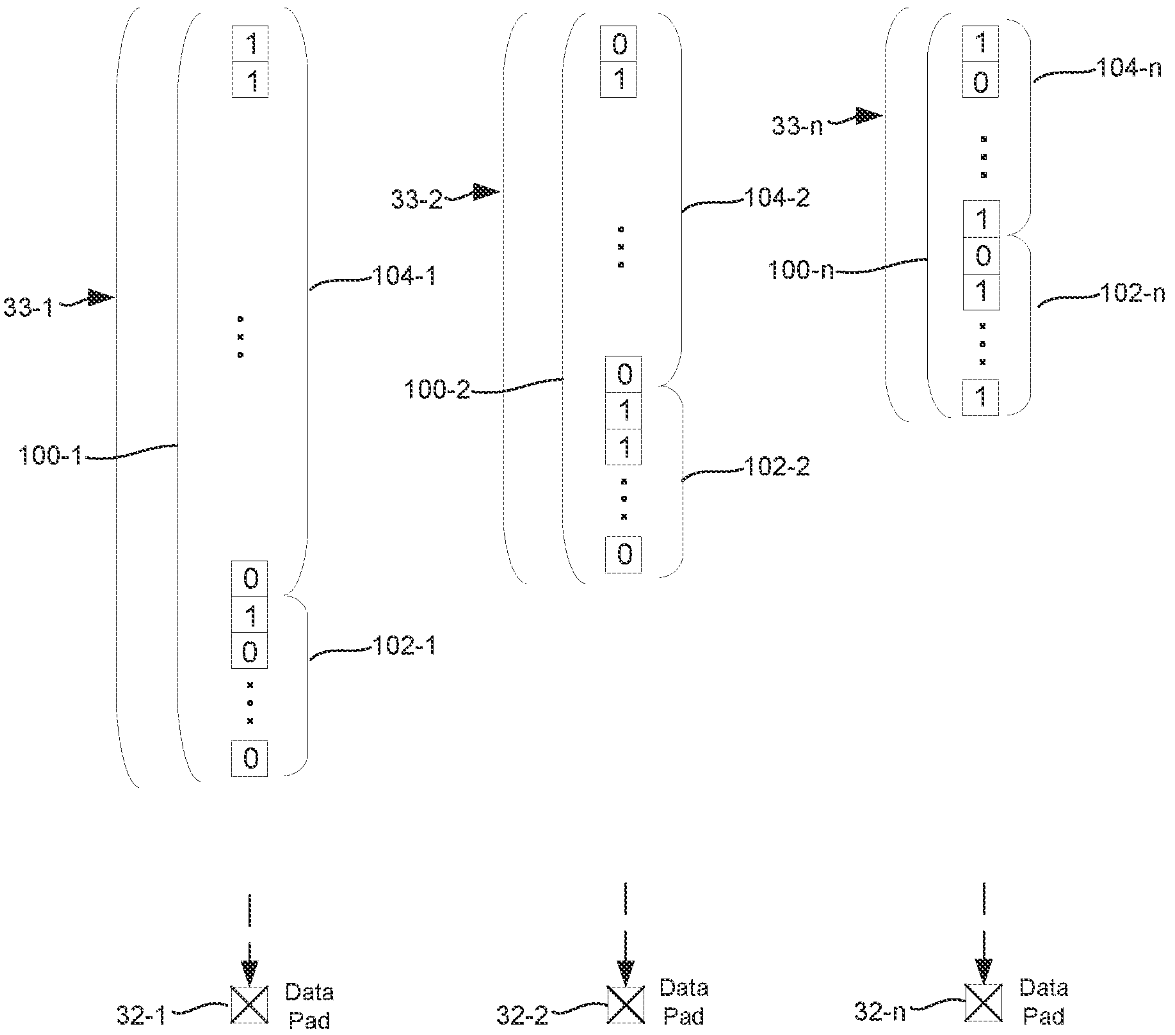
FIG. 4A is a schematic diagram generally illustrating data segments, according to one example.

FIG. 4A is a block diagram generally illustrating example data segments 33-1 to 33-*n* respectively received by print component 30 via data pads 32-1 to 32-*n*. As illustrated, each data segment 33 includes a fire pulse group 100 including a first portion of data bits 102 corresponding to the group of configuration functions 38 (sometimes referred to as configuration data), and a second portion of data bits 104 corresponding to the array of fluid actuators 40 (sometimes referred to as primitive data). For instance, with respect to data segment 33-1, the data bits of the first portion of data bits 102-1 correspond to the group of configuration functions 38-1 and include address data bits for address driver 60-1, and the data bits of the second portion of data bits 104-1 correspond to the array of fluid actuators 40-1, with each data bit of second portion 104-1 corresponding to a different one of the primitives P(1) to P(x). For each data segment 33, the number of data bits of the fire pulse group 32 (i.e., the number of fire pulse bits) is equal to the sum of the number of bits of the first portion of data bits 102 (i.e., configuration data bits) and the number of bits of the second portion of data bits 104 (i.e., primitive data).

According to the example of FIG. 4A, second portion 104-1 of fire pulse group 100-1 of data segment 33-1 is illustrated as having more primitive data bits than second portion 104-2 of fire pulse group 100-2 of data segment 33-2, and second portion 104-2 of fire pulse group 100-2 of data segment 33-2 is illustrated as having more primitive data bits than second portion 104-*n* of fire pulse group 100-*n* of data segment 33-*n*, meaning that, with reference to FIG. 2, the array of fluidic actuators 40-1 of fluidic die 36-1 has a greater number of primitives than the array of fluidic actuators 40-2 of fluidic die 36-2, while the array of fluidic actuators 40-2 of fluidic die 36-2 has a greater number of primitives than the array of fluidic actuators 40-*n* of fluidic die 36-*n* (i.e., x>y>z). As a result, fire pulse group 100-1 has more fire pulse group bits than fire pulse group 100-2, and fire pulse group 100-2 has more fire pulse group bits than fire pulse group 100-*n*, meaning that data segment 33-1 is longer (i.e., has more data segment bits) than data segment 33-2, and that data segment 33-2 is longer (i.e., has more data segment bits) than data segment 33-*n*.

With reference to FIG. 2, upon intermittent clock signal 35 being received at clock pad 34 (e.g., upon receiving the first rising edge of intermittent clock signal 35), data segments 33-1 to 33-*n* are serially loaded into the memory elements 51 of their respective arrays of memory elements 50-1 to 50-*n* of actuator groups 36-1 to 36-*n*. However, when sharing a same intermittent clock signal 35, as illustrated by the example implementation of FIG. 2, because of their different lengths, the number of cycles of intermittent clock signal 35 needed to load fire pulse group 100-1 of data segment 33-1 into array of memory elements 50-1 is greater than a number of clock cycles needed to load fire pulse groups 100-2 and 100-*n* of data segments 33-2 and 33-*n* into their respective arrays of memory elements 50-2 and 50-*n*. As a result, data bits of fire pulse groups 100-2 and 100-*n* of data segments 33-2 and 33-*n* will begin being respectively shifted out of arrays of memory elements 50-2 and 50-*n* before data bits of fire pulse group 100-1 of data segment 33-1 have finished being serially loaded into the array of memory elements 50-1. Consequently, if not accounted for, incorrect data will be populating the memory elements of arrays 50-2 and 50-*n* upon completion of loading data segment 33-1 into array 50-1.

Figure 4B:
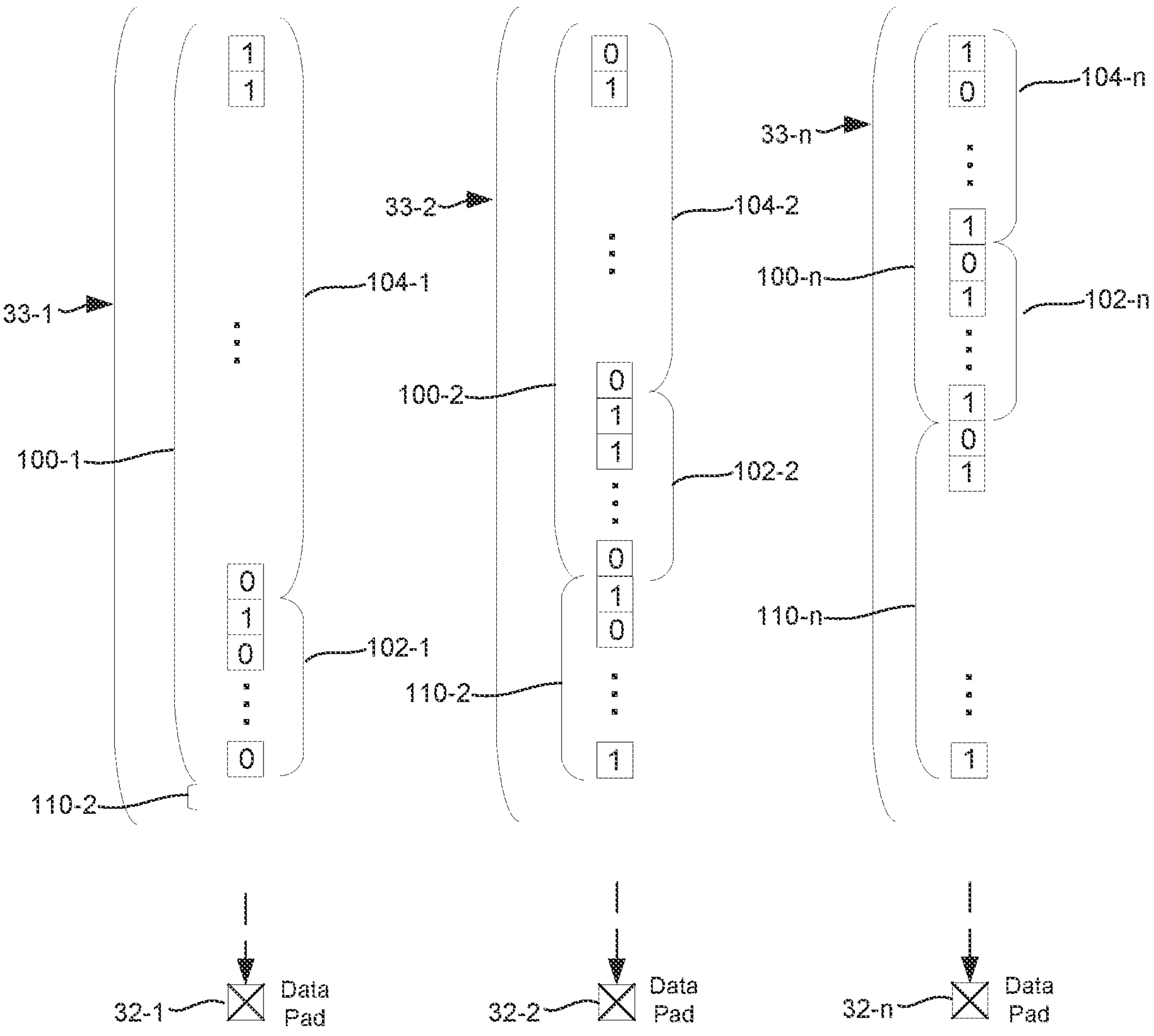
FIG. 4B is a schematic diagram generally illustrating data segments, according to one example.

With reference to FIG. 4B, according to one example, when sharing an intermittent clock signal, such as clock signal 35, in order to make each of the data segments 33-1 to 33-*n* equal in length (i.e., a same number of bits) so as to take a same number of clock cycles of intermittent clock signal 35 to load into their respective memory arrays 50-1 to 50-*n*, in addition to fire pulse groups 100-2 and 100-*n*, data segments 33-1 and 33-*n* each include a pre-pended segment of filler bits 110-1 and 110-*n*. According to one example, as illustrated, since data segment 33-1 is the longest data segment (i.e., has the most segment bits), the segment of filler bits 110-1 of data segment 33-1 contains no filler bits, while segments of filler bits 110-2 and 110-*n* each have a number of filler bits to respectively make data segments 33-2 and 33-*n* the same length as data segment 33-1 (with filler bit segment 33-*n* having more filler bits than filler bit segment 33-2). According to the example illustration of FIG. 4B, in general, segments of filler bits 110 are added to each shorter data segment 33 of data segments 33-1 to 33-*n* so that all data segments 33-1 to 33-*n* have a length the same as the longest data segment 33 of data segments 33-1 to 33-*n*.

By pre-pending filler bit segments 110-1 to 110-*n* to data segments 33-1 and 33-*n*, in a case where an intermittent clock signal is shared by actuator groups 36-1 to 36-*n*, when serially loading data segments 33-1 to 33-*n* into their respective arrays of memory elements 50-1 to 50-*n*, the last data bit of each data segments 33-1 to 33-*n* will be loaded on the same clock cycle so that each fire pulse group is properly loaded into their respective memory array 50-1 to 50-*n*, with the first and second portions of data bits 102 and 104 being respectively loaded into first and second portions 54 and 56 of the corresponding array of memory elements 50.

Prepending filler bit segments 110 to at least data segments 33 having shorter lengths so that all data segments 33 have a same length enables a clock signal 35 to be shared by multiple arrays of fluidic actuators 36 even when such arrays of fluidic actuators 36 have differing numbers of fluid actuators (FAs), which reduces and simplifies circuitry, such as that of print component 30.

In some examples, each of the data segments 33-1 to 33-*n* includes a filler bit segment 100 including a number of filler bits, where the number of filler bits in each filler bit segment 100-1 to 100-*n* is such that each of the data segments 33-1 to 33-*n* has a same length. In one example, each of the filler bits has either a logic "high" value (e.g. "1") or a logic "low" value ("0"), where the filler bits of each filler bit segment 100 have a pattern of logic "low" and logic "high" values to mitigate electromagnetic effects on print component 30 as data segments 33-1 to 33-*n* are respectively serially loaded in memory arrays 50-1 to 50-*n*.

Continuing with the illustrative example above, referring to FIGS. 2-3, in one case, upon the final data bit of each of the data segments 33-1 to 33-*n* being loaded into the respective array of memory elements 50-1 to 50-*n* (e.g., the last data bit each of the second portions 104-1 to 104-*n* of fire pulse groups 100-1 to 100-*n* being loaded into their respective memory element 51 corresponding to primitive P(1)), intermittent clock signal 35 is removed from clock pad 34 so that serial loading of data into memory arrays 50-1 to 50-*n* ceases.

According to one example, upon completion of loading of fire pulse groups 100-1 to 100-*n* into their respective memory arrays 50-1 to 50-*n*, a fire signal 72 (e.g., a fire pulse signal) is received on fire pad 70. With reference to FIGS. 2 and 3, in one example, in response to receipt of fire pulse signal 72, data stored in each memory element 51 of each array of memory elements 50-1 to **50-*n* are parallel shifted into a corresponding memory element in the corresponding array of fluid actuators 40-1 to 40-*n* or the group configuration functions 38-1 to 38-*n*. For example, in FIG. 3, in response to fire signal 72, primitive data stored in memory element 51 is shifted to a corresponding memory element 84 in primitive P(1**).

In one example, after being parallel shifted out of the arrays of memory elements 50-1 to **50-*n*, the fire pulse group data is processed by the corresponding groups of configuration functions 38-1 to 38-*n* and primitives (P(1) to P(x), P(1) to P(y), and P(1) to P(z)) to operate selected fluid actuators (FAs) to circulate fluid or eject fluid drops. For instance, with reference to FIG. 3, in one example, if the primitive data stored in memory element 84 has a logic high (e.g., "1") and a fire pulse signal 72 is present on communication path 74, the output of AND-gate 82 is set to a logic "high". If the address driven on address bus 62-1 by address encoder 60-1 in response to the address bits received from the corresponding memory element of the second group of memory elements 54-1 represents address "0", the output of Address Decoder "0" 88 is set to a logic "high". With the output of AND-gate 82 and Address Decoder "0" 88 each set to a logic "high", the output of AND-gate 90 is also set to a logic "high", thereby turning "on" corresponding FET 80 to energize fluid actuator FA(0**) to displace fluid (e.g., eject a fluid drop).

In one example, upon the fire pulse group data being shifted out of the arrays of memory elements 50-1 to **50-*n* in response to fire signal 72, intermittent clock signal 35 is again received via clock pad 34 and next data segments 33-1 to 33-*n* are serially loaded into the arrays of memory elements 50-1 to 50-*n***.

Figure 5:
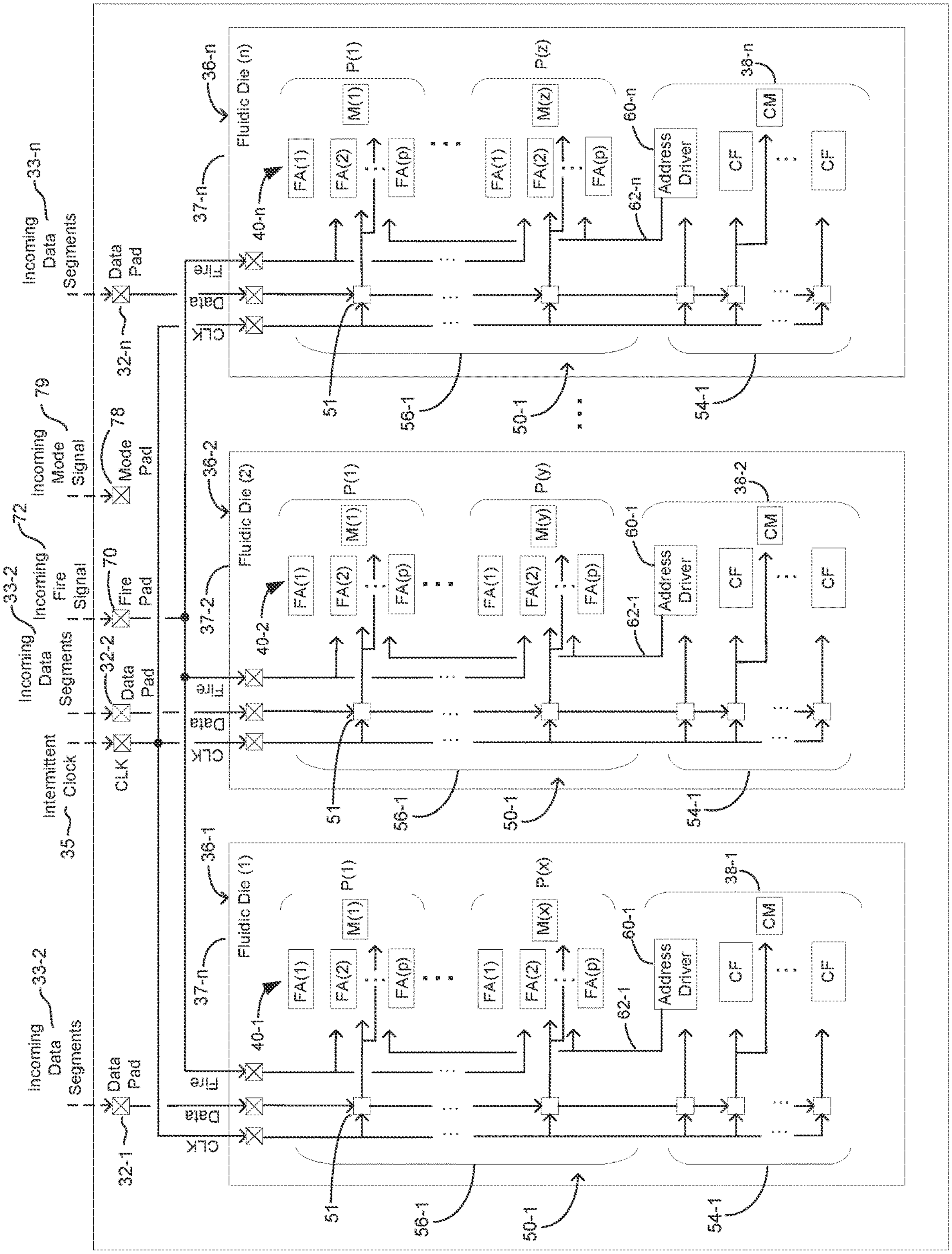
FIG. 5 is a block and schematic diagram illustrating a print component, according to one example.

FIG. 5 is a block and schematic diagram generally illustrating print component 30 of FIG. 2, where in addition to fluid actuators FA(1) to FA(p), primitives P(1) to P(x), P(1) to P(y), and P(1) to P(z) of actuator groups 40-1 to **40-*n* each include an array of memory elements, respectively illustrated as M(1) to M(x), M(1) to M(y), and M(1) to M(z). In one example, as illustrated, each of the groups of configurations 38-1 to 38-*n*** may include one or more memories, CM, each corresponding to a different one of the configuration functions.

In one example, print component 30 of FIG. 5 further includes a mode pad 78 to receive a mode signal 79. In one example, based on a state of mode signal 79, upon fire signal 72 being raised on fire pad 70, rather than data stored in the array of memory elements 50-1 to **50-*n* being shifted to the fluid actuators and configuration functions, the data is shifted to the primitive memory arrays of their respective primitives (e.g. M(1) to M(x), M(1) to M(y), and M(1) to M(z)) and to the configuration memory, CM, of the respective group of configuration functions 38-1 to 38-*n***.

Figure 6:
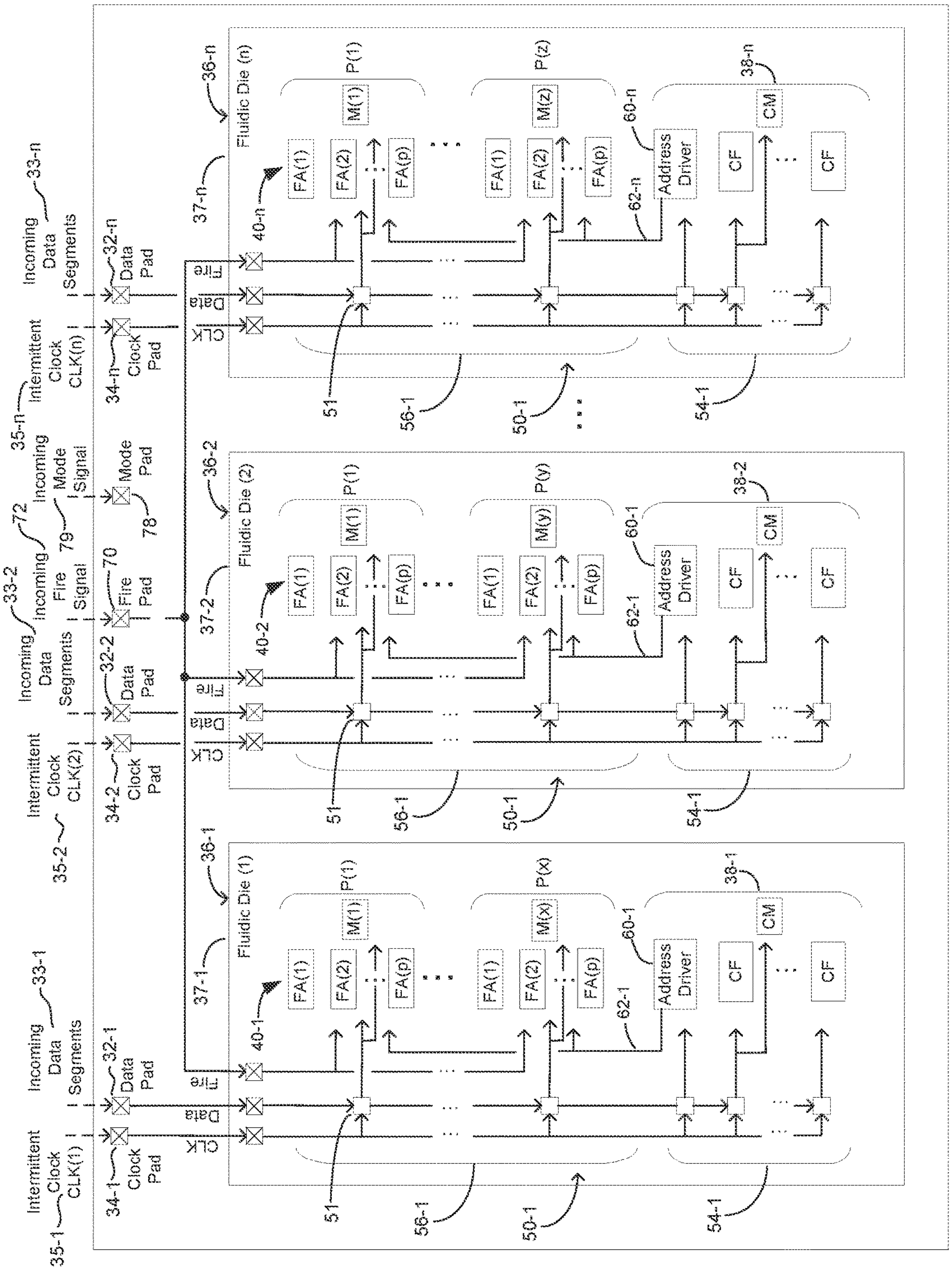
FIG. 6 is a block and schematic diagram illustrating a print component, according to one example.

FIG. 6 is a block and schematic diagram generally illustrating print component 30 of FIG. 5, where, in lieu of fluidic dies 37-1 to **37-*n* sharing a common intermittent clock signal 35, each fluidic die 37-1 to 37-*n* receives its own corresponding intermittent clock signal, illustrated as clock signals 35-1 to 35-*n* via corresponding clock pads 34-1 to 34-*n*. With reference to FIGS. 2-4, since intermittent clock signals 35-1 to 35-*n* may be separately controlled (e.g., may start and/or stop at differing times), data segments 33-1 to 33-*n* do not need to be of a same length and, thus, may not include filler bit segments 110. Referring to FIG. 6, upon completion of loading of fire pulse groups 100-1 to 100-*n* of data segments 33-1 to 33-*n* into the array of memory elements 50-1 to 50-*n* of the corresponding fluid die 37-1 to 37-*n*, fire signal 72** may be raised to initiate operations on the fire pulse group data (as described above).

Figure 7:
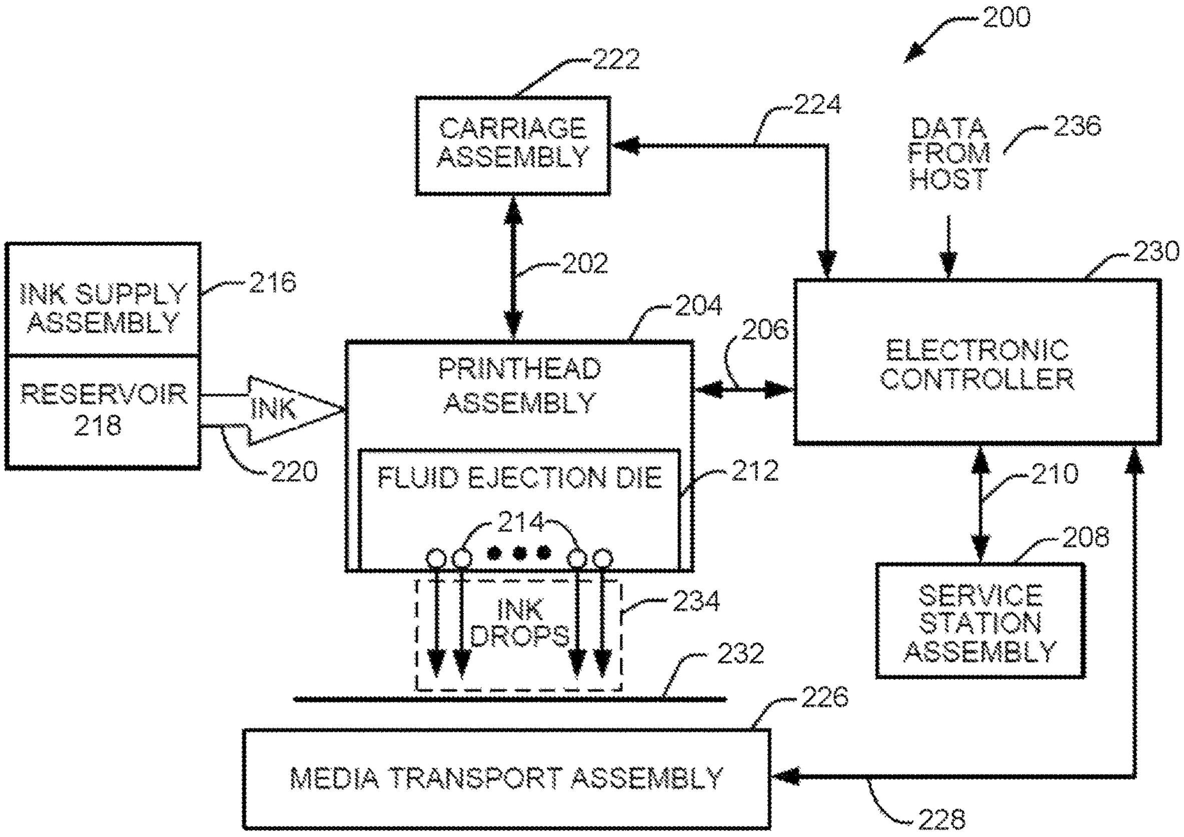
FIG. 7 is a schematic diagram illustrating a block diagram illustrating one example of a fluid ejection system.

FIG. 7 is a block diagram illustrating one example of a fluid ejection system 200. Fluid ejection system 200 includes a fluid ejection assembly, such as printhead assembly 204, and a fluid supply assembly, such as ink supply assembly 216. In the illustrated example, fluid ejection system 200 also includes a service station assembly 208, a carriage assembly 222, a print media transport assembly 226, and an electronic controller 230. While the following description provides examples of systems and assemblies for fluid handling with regard to ink, the disclosed systems and assemblies are also applicable to the handling of fluids other than ink.

Printhead assembly 204 includes at least one printhead 212 which ejects drops of ink or fluid through a plurality of orifices or nozzles 214, where printhead 212 may be implemented, in one example, as print component 30 with fluid actuators (FAs) of actuator groups 36-1 to **36-*n* implemented as nozzles 214, as previously described herein by FIG. 2, for instance. In one example, the drops are directed toward a medium, such as print media 232, so as to print onto print media 232. In one example, print media 232 includes any type of suitable sheet material, such as paper, card stock, transparencies, Mylar, fabric, and the like. In another example, print media 232 includes media for three-dimensional (3D) printing, such as a powder bed, or media for bioprinting and/or drug discovery testing, such as a reservoir or container. In one example, nozzles 214 are arranged in at least one column or array such that properly sequenced ejection of ink from nozzles 214 causes characters, symbols, and/or other graphics or images to be printed upon print media 232 as printhead assembly 204 and print media 232** are moved relative to each other.

Ink supply assembly 216 supplies ink to printhead assembly 204 and includes a reservoir 218 for storing ink. As such, in one example, ink flows from reservoir 218 to printhead assembly 204. In one example, printhead assembly 204 and ink supply assembly 216 are housed together in an inkjet or fluid-jet print cartridge or pen. In another example, ink supply assembly 216 is separate from printhead assembly 204 and supplies ink to printhead assembly 204 through an interface connection 220, such as a supply tube and/or valve.

Carriage assembly 222 positions printhead assembly 204 relative to print media transport assembly 226, and print media transport assembly 226 positions print media 232 relative to printhead assembly 204. Thus, a print zone 234 is defined adjacent to nozzles 214 in an area between printhead assembly 204 and print media 232. In one example, printhead assembly 204 is a scanning type printhead assembly such that carriage assembly 222 moves printhead assembly 204 relative to print media transport assembly 226. In another example, printhead assembly 204 is a non-scanning type printhead assembly such that carriage assembly 222 fixes printhead assembly 204 at a prescribed position relative to print media transport assembly 226.

Service station assembly 208 provides for spitting, wiping, capping, and/or priming of printhead assembly 204 to maintain the functionality of printhead assembly 204 and, more specifically, nozzles 214. For example, service station assembly 208 may include a rubber blade or wiper which is periodically passed over printhead assembly 204 to wipe and clean nozzles 214 of excess ink. In addition, service station assembly 208 may include a cap that covers printhead assembly 204 to protect nozzles 214 from drying out during periods of non-use. In addition, service station assembly 208 may include a spittoon into which printhead assembly 204 ejects ink during spits to ensure that reservoir 218 maintains an appropriate level of pressure and fluidity, and to ensure that nozzles 214 do not clog or weep. Functions of service station assembly 208 may include relative motion between service station assembly 208 and printhead assembly 204.

Electronic controller 230 communicates with printhead assembly 204 through a communication path 206, service station assembly 208 through a communication path 210, carriage assembly 222 through a communication path 224, and print media transport assembly 226 through a communication path 228. In one example, when printhead assembly 204 is mounted in carriage assembly 222, electronic controller 230 and printhead assembly 204 may communicate via carriage assembly 222 through a communication path 202. Electronic controller 230 may also communicate with ink supply assembly 216 such that, in one implementation, a new (or used) ink supply may be detected.

Electronic controller 230 receives data 236 from a host system, such as a computer, and may include memory for temporarily storing data 236. Data 236 may be sent to fluid ejection system 200 along an electronic, infrared, optical or other information transfer path. Data 236 represent, for example, a document and/or file to be printed. As such, data 236 form a print job for fluid ejection system 200 and includes at least one print job command and/or command parameter.

In one example, electronic controller 230 provides control of printhead assembly 204 including timing control for ejection of ink drops from nozzles 214. As such, electronic controller 230 defines a pattern of ejected ink drops which form characters, symbols, and/or other graphics or images on print media 232. Timing control and, therefore, the pattern of ejected ink drops, is determined by the print job commands and/or command parameters. In one example, logic and drive circuitry forming a portion of electronic controller 230 is located on printhead assembly 204. In another example, logic and drive circuitry forming a portion of electronic controller 230 is located off printhead assembly 204. In another example, logic and drive circuitry forming a portion of electronic controller 230 is located off printhead assembly 204. In one example, data segments 33-1 to **33-*n*, intermittent clock signal 35, fire signal 72, and mode signal 79 may be provided to print component 30 by electronic controller 230, where electronic controller 230 may be remote from print component 30**.

Figure 8:
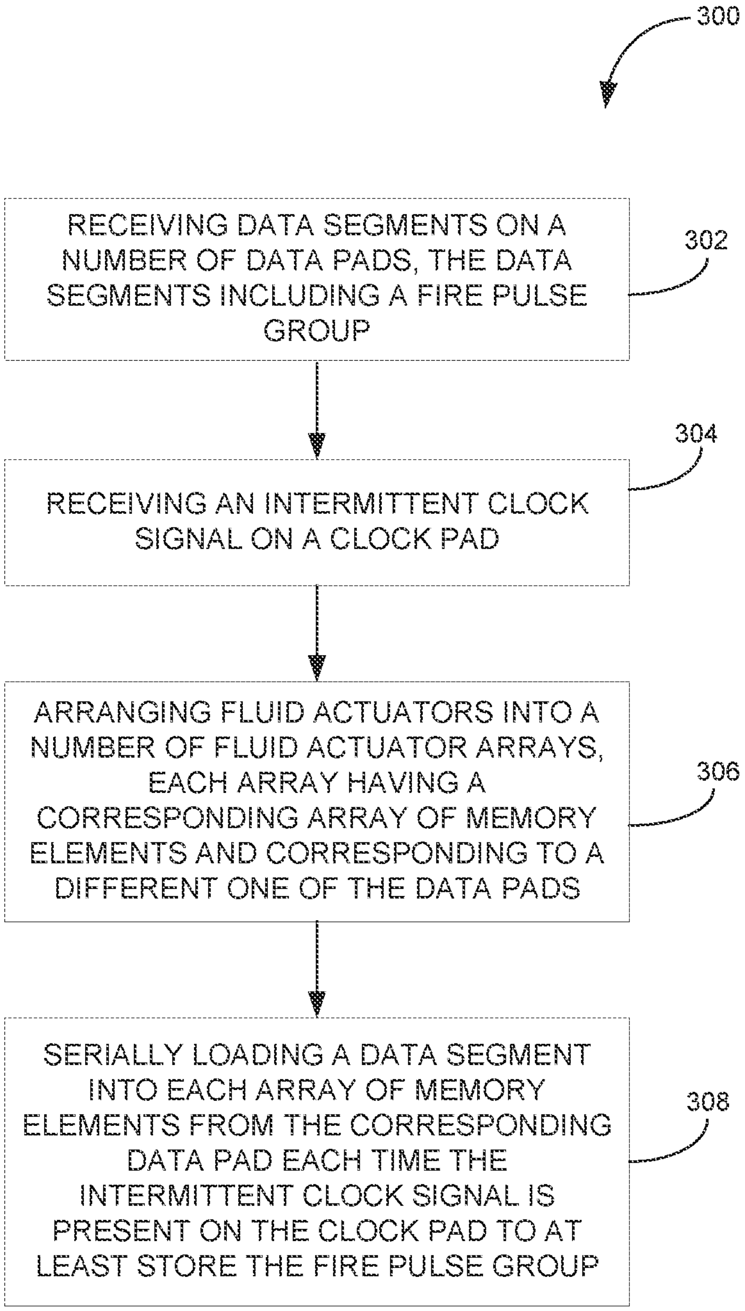
FIG. 8 is a flow diagram illustrating a method of operating a print component, according to one example.

FIG. 8 is a flow diagram illustrating a method 300 of operating a print component, such as print component 30 of FIGS. 2-4, in accordance with one example of the present disclosure. At 302, method 300 includes receiving data segments on a number of data pads, such as receiving data segments 33-1 to **33-*n* on data pads 32-1 to 32-*n* as illustrated by FIG. 2, where each data segment comprises a number of segment bits, the number of segment bits including a fire pulse group comprising a number of fire pulse group bits, with the number of segment bits being at least equal to the number of fire pulse group bits, such as illustrated by FIG. 4A where each data segment 33-1 to 33-*n* respectively includes a fire pulse group 100-1 to 100-*n***.

At 304, method 300 includes receiving an intermittent clock signal on a clock pad, such as print component 30 of FIG. 2 receiving an intermittent clock signal 35 on clock pad 34. At 306, method 300 includes arranging a number of fluid actuators to form a number of fluid actuator arrays, each array of fluid actuators having a corresponding array of memory elements corresponding to a different one of the data pads, such as actuator groups 36-1 to **36-*n* of FIG. 2 respectively including an array of fluid actuators 40-1 to 40-*n*, with the arrays of fluid actuators 40-1 to 40-*n* respectively having a corresponding array of memory elements 50-1 to 50-*n*, with the array of memory elements 50-1 to 50-*n* respectively having corresponding data pads 32-1 to 32-*n***.

At 308, method 100 includes serially loading a data segment from the corresponding data pad into each array of memory elements each time the intermittent clock signal is present on the clock pad to store at least the fire pulse group bits, such as respectively loading data segments 33-1 to **33-*n* (as illustrated by FIGS. 4A and 4B) into arrays of memory elements 50-1 to 50-1 so as to respectively store at least fire pulse segments 100-1 to 100-*n***.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A set of print components, comprising:

a plurality of dies, each corresponding to a different liquid type, wherein the plurality of dies share an intermittent clock signal and each die includes:

a data pad to receive data segments, each data segment comprising a number of segment bits, the number of segment bits including a fire pulse group comprising a number of fire pulse group bits different for each of the plurality of dies, wherein the number of segment bits is at least equal to the number of fire pulse group bits, and the data segments received on the data pad include a group of filler bits so that the number of segment bits of data segments received by one data pad is the same as a number of segment bits of data segments received by another data pad;

a fluidic actuator array corresponding to the intermittent clock signal and to the data pad, having a corresponding array of memory elements; and circuitry, connected to the data pad and the fluidic actuator array, and including the corresponding array of memory elements, the circuitry configured such that a rising edge of the intermittent clock signal causes the corresponding array of memory elements to serially receive a data segment from the data pad and to store at least the fire pulse group bits.

2. The set of print components of claim 1, each fluidic actuator array having a corresponding group of configuration functions.

3. The set of print components of claim 2, each array of memory elements including a first portion of memory elements corresponding to the group of configuration functions and a second portion of memory elements corresponding to the fluidic actuator array.

4. The set of print components of claim 1, the array of memory elements comprising a chain of memory elements adapted to function as a serial-to-parallel data converter.

5. The set of print components of claim 4, wherein the array of memory elements includes a sequential logic circuit.

6. The set of print components of claim 5, the sequential logic circuit adapted to function as a serial-in, parallel-out shift register.

7. The set of print components of claim 1, wherein the corresponding array of memory elements is to load the data segments from the corresponding one of the plurality of data pads only when the intermittent clock signal is present on the clock pad.

8. The set of print components of claim 1, wherein the fire pulse group does not include a start bit sequence that identifies a beginning of the fire pulse group.

9. The set of print components of claim 8, wherein the print component does not include data parser circuitry to detect the beginning of the fire pulse group.

10. A set of print components, comprising:

a plurality of dies, each corresponding to a different liquid type, wherein the plurality of dies share an intermittent clock signal and a fire signal, and each die includes:

a fire pad to receive the fire signal;

a clock pad to provide the intermittent clock signal provided at differing times;

at least one data pad to receive data segments, each data segment comprising a number of segment bits, the number of segment bits including a fire pulse group comprising a number of fire pulse bits different for each of the plurality of dies, wherein the number of segment bits is at least equal to the number of fire pulse group bits, and the data segments received on the at least one data pad include a group of filler bits so that the number of segment bits of data segments received by one data pad is the same as a number of segment bits of data segments received by another data pad;

a fluidic actuator array corresponding to the intermittent clock signal and to the at least one data pad, having a corresponding array of memory elements; and circuitry, connected to the at least data pad and the fluidic actuator array, and including the corresponding array of memory elements, the circuitry configured such that a rising edge of the intermittent clock signal causes the corresponding array of memory elements to serially receive a data segment from the at least one data pad and to store the fire pulse bits.

11. The set of print components of claim 10, the array of memory elements comprising a chain of memory elements adapted to function as a serial-to-parallel data converter.

12. The set of print components of claim 11, the array of memory elements comprising a sequential logic circuit.

13. The set of print components of claim 12, the sequential logic circuit adapted to function as a serial-in, parallel-out shift register.

14. The set of print components of claim 10, including:

a plurality of clock pads, wherein each clock pad is to receive a corresponding one of a plurality of intermittent clock signals that include the intermittent clock signal, and corresponds to each of the plurality of dies.

15. The set of print components of claim 14, wherein the plurality of intermittent clock signals are provided at differing times.

16. The set of print components of claim 10, wherein the corresponding array of memory elements is to load the data segments from the corresponding one of the plurality of data pads only when the intermittent clock signal is present on the clock pad.

17. The set of print components of claim 16, wherein the corresponding array of memory elements is to serially load the data segments in response to the clock pad receiving a rising edge of the intermittent clock signal.

18. The set of print components of claim 10, wherein the fire pulse group does not include a start bit sequence that identifies a beginning of the fire pulse group.

19. The set of print components of claim 18, wherein the print component does not include data parser circuitry to detect the beginning of the fire pulse group.

20. A plurality of print components, comprising:

a fluidic actuator array of each component, each array corresponding to a different liquid type, wherein the plurality of fluidic actuator arrays share an intermittent clock signal and a fire signal, and each component includes:

a clock pad to provide the intermittent clock signal;

a fire pad to receive the fire signal;

at least one data pad to receive data segments, each data segment comprising a number of segment bits, the number of segment bits including a fire pulse group comprising a number of fire pulse group bits, wherein the number of segment bits is at least equal to the number of fire pulse group bits, and the data segments received on the at least one data pad include a group of filler bits so that the number of segment bits of data segments received by one data pad is the same as a number of segment bits of data segments received by another data pad; and circuitry, connected to the at least one data pad and the fluidic actuator array, and including at least one corresponding memory element, wherein a rising edge of the intermittent clock signal causes the at least one corresponding memory element to serially receive a data segment from the at least one data pad and to store the at least one fire pulse group bit.

21. The plurality of print components of claim 20, the at least one corresponding memory element comprising a chain of memory elements adapted to function as a serial-to-parallel data converter.

22. The plurality of print components of claim 21, the at least one corresponding memory element comprising a sequential logic circuit.

23. The plurality of print components of claim 22, the sequential logic circuit adapted to function as a serial-in, parallel-out shift register.

24. The plurality of print components of claim 20, comprising a plurality of data pads, each of which corresponds to one of the plurality of fluidic actuator arrays.

25. The plurality of print components of claim 20, the at least one fluidic actuator array arranged to form a plurality of primitives, each primitive having a same number of fluid actuators, and the at least one corresponding memory element including a first portion corresponding to at least one configuration function and a second portion corresponding to the at least one fluidic actuator array.

26. The plurality of print components of claim 20, the print component comprising a printhead.

27. The plurality of print components of claim 20, the print component comprising a mode pad to receive a mode signal, wherein a state of the mode signal indicates whether a data value stored in the at least one corresponding memory element corresponds to the at least one fluidic actuator array.

* * * * *